(12) United States Patent
Howard

(10) Patent No.: US 8,380,902 B2
(45) Date of Patent: Feb. 19, 2013

(54) SITUATION UNDERSTANDING AND INTENT-BASED ANALYSIS FOR DYNAMIC INFORMATION EXCHANGE

(76) Inventor: Newton Howard, Arlington, VA (US)

(*) Notice: Subject to any disclaimer, the term of this patent is extended or adjusted under 35 U.S.C. 154(b) by 1322 days.

(21) Appl. No.: 11/987,896

(22) Filed: Dec. 5, 2007

(65) Prior Publication Data

US 2008/0155147 A1    Jun. 26, 2008

Related U.S. Application Data

(60) Provisional application No. 60/872,788, filed on Dec. 5, 2006.

(51) Int. Cl.
*G06F 13/42* (2006.01)

(52) U.S. Cl. ..................... 710/105; 705/7.15

(58) Field of Classification Search .............. 710/105, 710/104, 100
See application file for complete search history.

(56) References Cited

U.S. PATENT DOCUMENTS

| | | | |
|---|---|---|---|
| 6,114,990 A | 9/2000 | Bergljung et al. | |
| 6,209,873 B1 | 4/2001 | DeGeorge | |
| 6,408,404 B1 * | 6/2002 | Ladwig | 714/39 |
| 6,420,993 B1 | 7/2002 | Varon | |
| 6,529,934 B1 * | 3/2003 | Kawamura et al. | 718/102 |
| 6,640,231 B1 | 10/2003 | Andersen et al. | |
| 2002/0032733 A1 | 3/2002 | Howard | |
| 2006/0178918 A1 | 8/2006 | Mikurak | |
| 2006/0253330 A1 | 11/2006 | Maggio et al. | |

OTHER PUBLICATIONS

Notification dated Oct. 9, 2008 which accompanies an International Search Report and a Written Opinion of the International Searching Authority in PCT/US07/24874.

* cited by examiner

*Primary Examiner* — Ojo O Oyebisi
(74) *Attorney, Agent, or Firm* — Smith, Gambrell & Russell

(57) ABSTRACT

The system provides predictive error-checking and conflict resolution by comparing data contained in cognitive artifacts such as orders/instructions and reports against one another and against existing domain-specific databases, procedural and conceptual models, reasoning schemes, (in military domain specific applications, that would be terrain, weather, equipment, artillery, logistics, rules of engagement, field manuals, military doctrine, models of war games, etc) to determine their validity and effectiveness. Possible situations, states, or conditions arising from inferred actors' intent are recognized through expert systems analysis and trigger information exchanges. The system further advance Intention Awareness by enabling users to view information corresponding to the applicable environment obtained from external application systems across interoperability bridge. Through its graphical user interface the system allow users to graphically visualize and communicate their intent. The system also provides the management of information exchanges, where decisions to exchange a specific item of information are based on a set of metrics within a particular application-specific domain knowledge (such as importance, scope, time window of relevance as well as doctrine and rules of engagement in a military domain knowledge. Such metrics are evaluated while making information exchange decisions.

17 Claims, 4 Drawing Sheets

SITUATION UNDERSTANDING AND INTENT-BASED ANALYSIS FOR DYNAMIC INFORMATION EXCHANGE

CROSS REFERENCE TO RELATED APPLICATIONS

This patent application is related to and claims priority to commonly-owned U.S. Provisional Patent Application Ser. No. 60/872,788 entitled "Situation Understanding and Intent-Based Analysis for Dynamic Information Sharing" filed on Dec. 5, 2006, which is hereby incorporated by reference in its entirety. This patent application is also related to U.S. patent application Ser. No. 09/912,918 entitled "Intent-Based Automated Conflict Prediction and Notification System" filed Jul. 25, 2001, which is hereby incorporated by reference in its entirety.

TECHNICAL FIELD

The present invention relates generally to the field of automated systems, and more particularly to an automated system for predicting conflicts among issued instructions based on the issuer's intent, and the management of information exchange between the automated system and other systems.

BACKGROUND OF THE INVENTION

Amidst a technologically advanced society, the quest for increasing automation with effective integration continues. From coffee makers with an automatic start to military control centers with automatic notification of enemy vessels, automation often necessitates the inclusion of some problem recognition features. For example, some coffee makers include an automatic shut off that recognizes leaving the coffee maker on too long can also create a problem. Without problem recognition, automated systems could continue in a regular operation mode, which often exacerbates the problem. Consequently, there has been development in the area of recognizing situations that require action on the part of the automated systems.

Numerous systems include a rule-based problem recognition system designed to issue some sort of notification when a particular situation is recognized. When systems receive information from several sources, these systems may recognize that a problem exists as received information conflicts with one of the preset rules. Rule based conflict recognition has been used in many areas including military tactics. Militaries employ countless technologies to gather and disseminate battlefield information. Generally, the goal is eliminating uncertainty and conflict recognition using awareness of circumstances, or situational awareness.

Situational Awareness refers to an explicit knowledge of the current state of the physical world surrounding the actor. Intention Awareness connotes a more implicit knowledge of the mental world—knowledge of the actor's states of mind and its understanding of others' intentions. Situational Awareness involves the present moments while Intention Awareness indicates the most probable future states by focusing on the understanding of motivations of the actors involved. Intention Awareness informs and enhances Situational Awareness, providing a more comprehensive understanding of an existing situation. Consequently, situation recognition systems that consider only Situational Awareness are devoid of information that could critically impact the future.

Military domain, while by far not the only area where these systems are used, provides a lot of examples that demonstrate their applications. To date, Situational Awareness has advanced primarily by providing a soldier with a near real-time view of current battlefield conditions. Some current focus on advancing and sharing Situational Awareness by enabling the soldier to receive, compare, and communicate battle state information faster and more accurately. Through the use of embedded computing and communications systems, these Situational Awareness systems enable the coordination of units and weapon systems to participate in a battle with better reliability, lethality, survivability, and tempo of attack.

While Situational Awareness does aid in situation recognition, knowledge of physical circumstances rarely provides a complete view of a situation. Possessing Situation Awareness alone can considerably impact the most common tasks, such as navigating a busy parking lot. With a brief glance around, a driver becomes immediately aware of the locations of the other cars and people moving around the lot. Knowledge of these objects and their relative positions provide Situational Awareness. Because the situation may change, the driver should be aware of the intentions of the other drivers and pedestrians. For example, a pedestrian who has been waiting for the car to pass is likely to walk behind the driver's car. If the driver remains unaware of the pedestrian's intention, the driver could seriously injure the pedestrian if driver decides to stop and reverse.

Consequently, systems that utilize only Situational Awareness can remain susceptible to potentially dangerous situations. For example, military tactics that use Situational Awareness currently provide a great deal of assistance both in coordinating the flow of orders and information and also in visualizing the current state of battle. However, fratricide studies show that even powerful tools like these still prove insufficient when forced to operate in such a chaotic, interdependent, and fast-paced environment as the $21^{st}$ century battlefield. Fratricide as used herein means unintentionally firing upon and killing friendly, or non-enemy, troops. Hence, each case of fratricide is a mistake, most often resulting from misidentification, miscommunication, or other factors, which have contributed to a shooter's confusion. However, these mistakes often result in the loss of lives. Some current systems employ Situational Awareness to reduce uncertainty and confusion. Yet, there has been only a minimal reduction in the frequency of fratricide using these systems. As described above, Situational Awareness alone does not provide a complete picture of a given situation. Accordingly, despite the development in the area of notification systems, conventional solutions still fail to provide a complete view of a given situation.

These systems are further limited when extended beyond a single military force or organizational entity to a plurality of interacting entities. Information exchange between a plurality of interacting entities can be achieved by employing all-to all-rapid communication capability to facilitate total information exchange. However, misuse of all-to-all communication leads to unnecessary and time-consuming "noise" and causes information overload. In these cases, there is a need for information exchange to be intent driven by design so as to eliminate information overload by providing relevant and timely information. Often times, when there are a plurality of interactive entities, heterogeneous information systems are implemented each with distinct information exchange, processing, and integration requirements. In these cases, there is a need for intent driven information exchange with additional functionality for dynamic information sharing based on the information exchange requirements of each interactive entity and using data formats and structures specific for the domain.

SUMMARY OF THE INVENTION

The present invention meets the needs described above by providing an automated situation recognition, conflict prediction and notification system that utilizes Intention Awareness, and manages information exchange arrangements that can be used in a host of areas such as management, communications, traffic control, logistics, medical treatment, workflow and resource organization, and command & control systems. Using temporal relational datasets and models, procedural and conceptual models (e.g. domain specific models of concepts and procedures), reasoning schemas (e.g. rule-based reasoning or scenario-based reasoning), and specified context of observation, the invention reconstructs any observed physical state as a finite sequence of states and actions. These sequences of actions and consequential states are guided by intentions. Therefore, they are instantiations of selective and controlled causality exercised by actors systems operating in the physical world subject to observation.

As an example, when the invention is used in command and control systems, it provides predictive error checking, increased Intention Awareness, and enhanced communication. It also manages the exchange of information with other systems that it can communicate with, whether one or more of the other systems is homogeneous or heterogeneous.

The invention provides predictive error-checking and conflict resolution by comparing data contained in cognitive artifacts such as orders/instructions and reports against one another and against existing domain-specific databases, procedural and conceptual models, reasoning schemes, (in military domain specific applications, that would be terrain, weather, equipment, artillery, logistics, rules of engagement, field manuals, military doctrine, models of war games, etc) to determine their validity and effectiveness. Possible situations, states, or conditions arising from inferred actors' intent (in military domain specific applications, that would be units moving into a line of fire, NBC hazard, airstrike zone, or minefield, or beyond the reach of logistical support) are recognized through expert systems analysis and trigger information exchanges.

In addition to situation assessment, the inventive systems further advance Intention Awareness by enabling users to view information corresponding to the applicable environment obtained from external application systems across interoperability bridge. The inventive system, through its graphical user interface allow users to graphically visualize and communicate their intent using multi-modal content and a variety of input/output devices such as multi-level overlays, digital pen capabilities.

The inventive system, through its Interoperability Bridge, allows the use of different data types and formats as input and output, enabling its interoperability with a wide range of partners with whom the inventive system can exchange information.

The inventive system uses ontologies that enable a shared world view that is used by system's components such as user interface and an engine, which represent and interpret data or information that is received from other systems via the Interoperability Bridge and make decisions based on the interpreted data or information.

Furthermore, the inventive system provides the management of information exchanges, where decisions to exchange a specific item of information are based on a set of metrics within a particular application-specific domain knowledge (such as importance, scope, time window of relevance as well as doctrine and rules of engagement in a military domain knowledge. Such metrics are evaluated while making information exchange decisions In view of the foregoing, it will be appreciated that the automated system of the present invention avoids the drawbacks of prior systems. The specific techniques and structures employed by the invention to improve over the drawbacks of the prior systems and accomplish the advantages described above will become apparent from the following detailed description of the embodiments of the invention and the appended drawings and claims.

In an embodiment of the present invention, a system for providing intention-based automated conflict prediction, notification and information exchange management is provided. An interoperability bridge is configured to receive data and provide data to an ontology bus. The ontology bus includes an Application Specific domain configured to provide objects that define a view for a particular type of environment/application specific domain, an Exchange Control domain configured to provide current requirements for exchanging information; and an Information Extraction domain configured to store intermediate results of predicted occurrences based on the comparison of received data and an intent inferred from the received data with known data. An engine configured to receive and monitor input from the objects that define the view for an occurrence of at least one pre-defined condition, wherein the occurrence of the pre-defined condition requires a change to a current information exchange agreement.

In an embodiment of the invention, the interoperability bridge translates the received data from a first format to a second format.

In an embodiment of the invention, the current information exchange agreement specifies a policy for the exchange of information between the system and an external system.

In an embodiment of the invention, the data is received from an external system.

In an embodiment of the invention, the engine predicts the potential occurrence of one or more conditions by comparing the received data with application specific knowledge data.

In an embodiment of the present invention, the application specific knowledge data is obtained from a application specific domain database.

In an embodiment of the invention a user interface is configured to provide information representing the current conditions of objects in the view.

DETAILED DESCRIPTION OF THE EMBODIMENTS

The present invention may be embodied in an intention-based automated conflict prediction, notification and information exchange management system for nondeterministic identification and resolution of conflicts and the dynamic exchange of information. In computing, nondeterministic applications generally refers to systems whose emergent property is that they depend upon the contextual interaction between users and data. Because identification and resolution of nondeterministic situations applies to many environments, the invented system is applicable in management, medical treatments, and other fields, as well as military operations.

The inventive system implements software agents operating using a number of ontology domains on a shared ontology bus that is periodically updated based on incoming data or information from external application specific systems. An application specific system's interoperability with the inventive system can be heterogeneous or homogeneous. The software agents are assigned to specific areas of interest within an application and they analyze information related to their respective areas of interest and provide information to drive information exchange decisions, such as proposing new sharing requirements, notification of potential conflicts, etc. Intent-based analysis is incorporated into the agents' functionality enabling prediction capability and facilitating better decision support.

Actions are purposeful and thus guided by intentions. Accordingly, action or observed physical situations provide enough information to form hypotheses about the guiding intentions of an actor. Intentions are manifested in the drivers of observed physical situations or actions. These drivers include, but are not limited to, the issuing of order or instructions as well as the physical performance of an activity. For example, Military orders drive all actions of a military organization or unit. Such orders are the contextual, logical and spatiotemporal containers of intentions. The agents communicate via an ontology bus that allows for information, including intent, to be provided by various agents as they process information received from external systems.

On the ontology bus, intent can be represented by multiple instances of data structures specified by the ontology. These instances describe one or more intended situations that an entity's actions are ultimately aiming to achieve (based on known or inferred plan or instruction). These agents can process and exchange instances to evaluate the likely outcome of actions to determine the informational needs arising from them.

Figure 1:
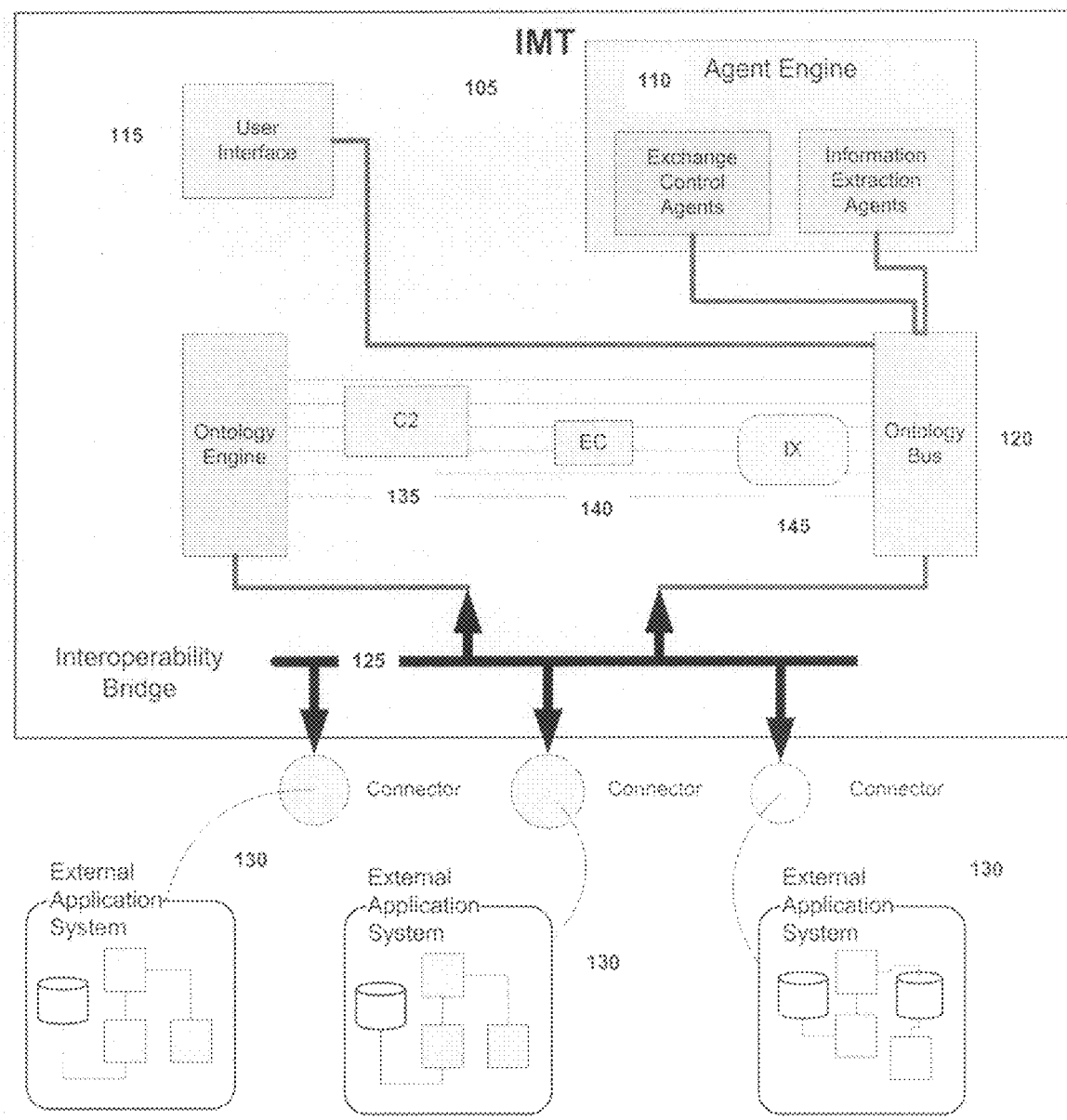
FIG. 1 is a functional block diagram of an intention-based automated conflict prediction, notification and information exchange management system coupled to an input/output Application Specific system.

Turning now to the figures, in which like numerals refer to like elements through the several figures, FIG. 1 is a functional block diagram of an intention-based automated conflict prediction, notification and information exchange management system 100 according to an exemplary embodiment of the present invention coupled to an external application system coupled to an external application system 130. In the FIG. 1 embodiment of the present invention, the system 100 includes Information Management Tool (IMT) framework 105, an agent engine 110, a user interface 115, an ontology bus 120, an interoperability bridge 125. In an embodiment of the present invention, IMT 105 is incorporated in a legacy system, such as an external application system 130. In an embodiment of the present invention, IMT 105 is coupled to one or more external applications. The ontology bus 120, composed of several ontology domains, provides a shared world view of received data or information that is used by the user interface 115 and agent engine 110 to represent and interpret data or information received from an external application system over interoperability bridge 125. The intent of a plan or instruction becomes more refined when the information or data describing entity actions (e.g., unit location in military area) is analyzed relative to a known or inferred plan or instruction is performed in a hierarchical fashion, such as based on a chain of command when implemented in a military environment. In an embodiment of the present invention, the intent of a plan or instructions are represented by agents as predictions of how the ontology will appear or is desired to appear at some future time.

The ontology bus 120 is represented by an object oriented environment whose specific configuration is determined by the environment in which it is being implemented. In an embodiment of the present invention, the ontology bus 120 is represented using JavaBeans. The ontology bus 120 can be described using any number of commonly used modeling languages that can be converted to an object oriented implementation of the structure using automated tools. In an embodiment of the present invention, the modeling language Unified Modified Language (UML) is used to represent the model of the ontology.

In an embodiment of the present invention, the ontology bus 120 allows for tagged, nested instances of the ontology to be written stored in it. The activity of the Information Extraction (IX) agent is dependent upon the ability to effectively analyze existing information and predict future requirements for extraction. The development and storage of both past and predicted future states of the ontology are provided. Since the model itself represents all available information at any point in time, the ability to nest instances of the model within itself is sufficient for the representation of any future and past state.

In an embodiment of the present invention, the model will include information about each entity and its associated attributes (e.g., top unit speed) and range of values for every attribute. In order to effectively analyze data knowledge is required about what potential values exist. Abstractly, the model or infrastructure can include methods of discovering these ranges in real time so that information extraction systems can adapt in various environments.

In an embodiment of the present invention, the ontology bus allows for the analysis of various states without confusion. Some systems will only be able to operate on models of certain types. Since various states will exist simultaneously it is important that these systems are able to only look at the data that they can properly interpret and are not confused by the existence of states in a form similar or exactly like what they are expecting.

In an embodiment of the present invention, Information Extraction results are interpreted with regard to various attributes such as probability, importance, criticality (a weighted combination of probability and importance) and time. The system is able to understand and pass this data on so that it can be properly interpreted and weighed at each level.

In an embodiment of the invention, the ontology bus allows agents to record metrics of accuracy or importance of the information being written back into the ontology. This is done for refining the model. It is important due to the variation in systems that the data about accuracy of information be stored for analysis. Without this information future insight into the system will be difficult if not impossible. For further refinement, the state of the ontology can be stored at key decision points. If certain pieces of information are consistently wrong or right it is important that the complete state of the information that could be used to optimize the extraction of information be present for analysis.

The drivers of actions, such as OPORDS in a military environment, are available within the model. These OPORDS encode the intent at various levels of the command hierarchy. Intent is necessary to determine what information is important given the goals and methods at the various levels. Additionally, hierarchy levels, whether it be a military command or organizational supervisory levels, is available within the model. For the proper interpretation of information the relationship between various hierarchical level and OPORDS, especially where it concerns the command hierarchy, must exist within the model for analysis.

Ontology bus 120 includes Application Specific domain (C2) 135, Exchange Control domain (EC) 140, and Information Extraction domain (IX) 145. The Application Specific domain (C2) 135 includes the ontology for the basic elements that will define the world view that will be represented by IMT 105. The objects that are selected to represent the world view is defined by the environment in which the IMT is being implemented. For example, a military environment objects can be selected to represent platoons and base camps. The Exchange Control domain (EC) 140 includes the ontology about currently existing information exchanging arrangements and policies (e.g., IDs of groups of entities or specific entities that a particular entity needs to know about). Requirements for information sharing policies could be based on cognitive, logical, spatial, temporal, or based on rules or scenarios. For example and in a military specific application, two platoons may exchange information about enemy movement if both are within a physical proximity from each other. Therefore, in this case, a policy to exchange enemy information is activated once these two platoons are physically close to each other.

Figure 2:
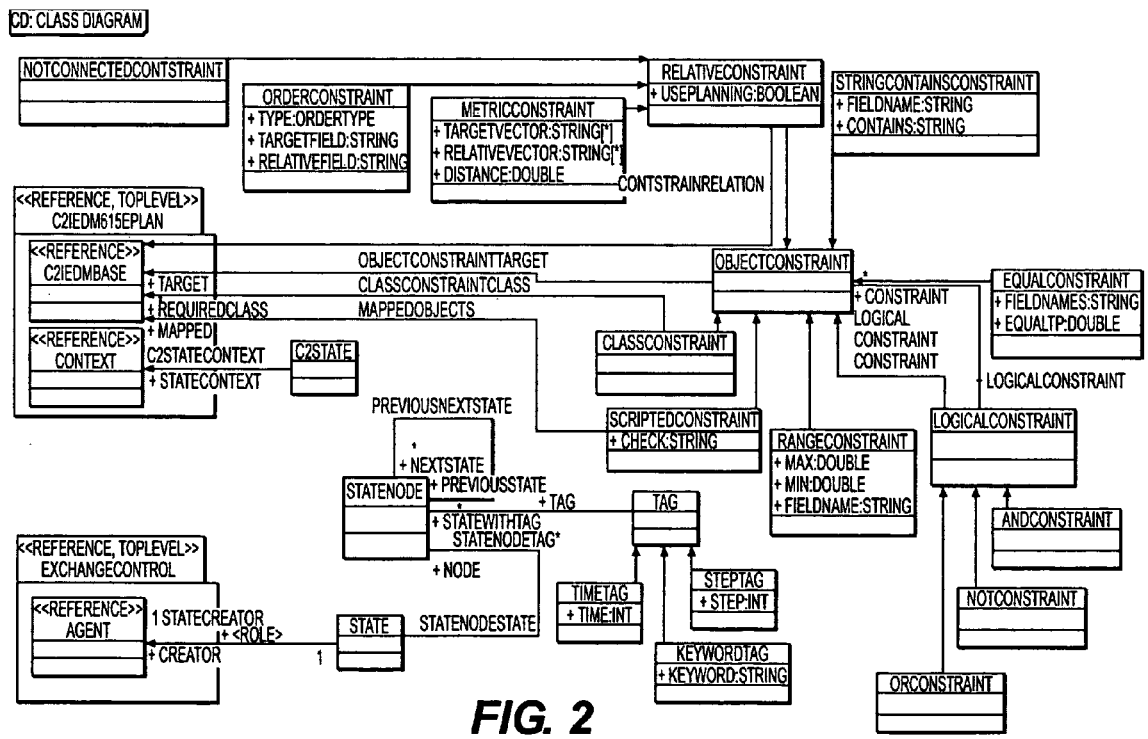
FIG. 2 is illustrates a model for the Information Extraction domain according to an embodiment of the present invention.

The Information Extraction domain (IX) 145 is essentially used as a "scratch-pad" that is used by IX agent(s) to store intermediary results of predictions, and is accessed by EC agents when making the decision regarding information exchange arrangements. In an embodiment of the invention, a "scratch-pad" may contain any objects contained in Application Specific domain 135. Any object can be tagged allowing arbitrary groupings of objects. Tagging includes, but is not limited to, assigning one or more objects one or more specific identifiers; an example could be a timestamp, which would allow pulling out the ontology's state at a certain time. Essentially, it can contain one or more copies of the world view, with or without modifications. By tagging, it can also create sequences of past or future situations. FIG. 2 is illustrates a model for the Information Extraction domain according to an embodiment of the present invention.

Engine 110 includes Exchange Control agent and Information Extraction agent. Exchange Control (EC) provides functionality for monitoring the world view for pre-defined situations in which a change to a shared agreement will be required, and communicates with the external application system 130 and exchange the necessary information. In an embodiment of the present invention, the Exchange Control agent can access all ontology domains, takes input from AS, EC and IX domains to come to a decision. Information Extraction (IX) agent includes functionality for building prediction of the potential situations represented in the world view, and stores intermediary results in the IX domain. In an embodiment of the present invention, The Information Exchange agent can access all ontology domains, mostly takes input from AS domain and creates instances in the IX domain.

Figure 3:
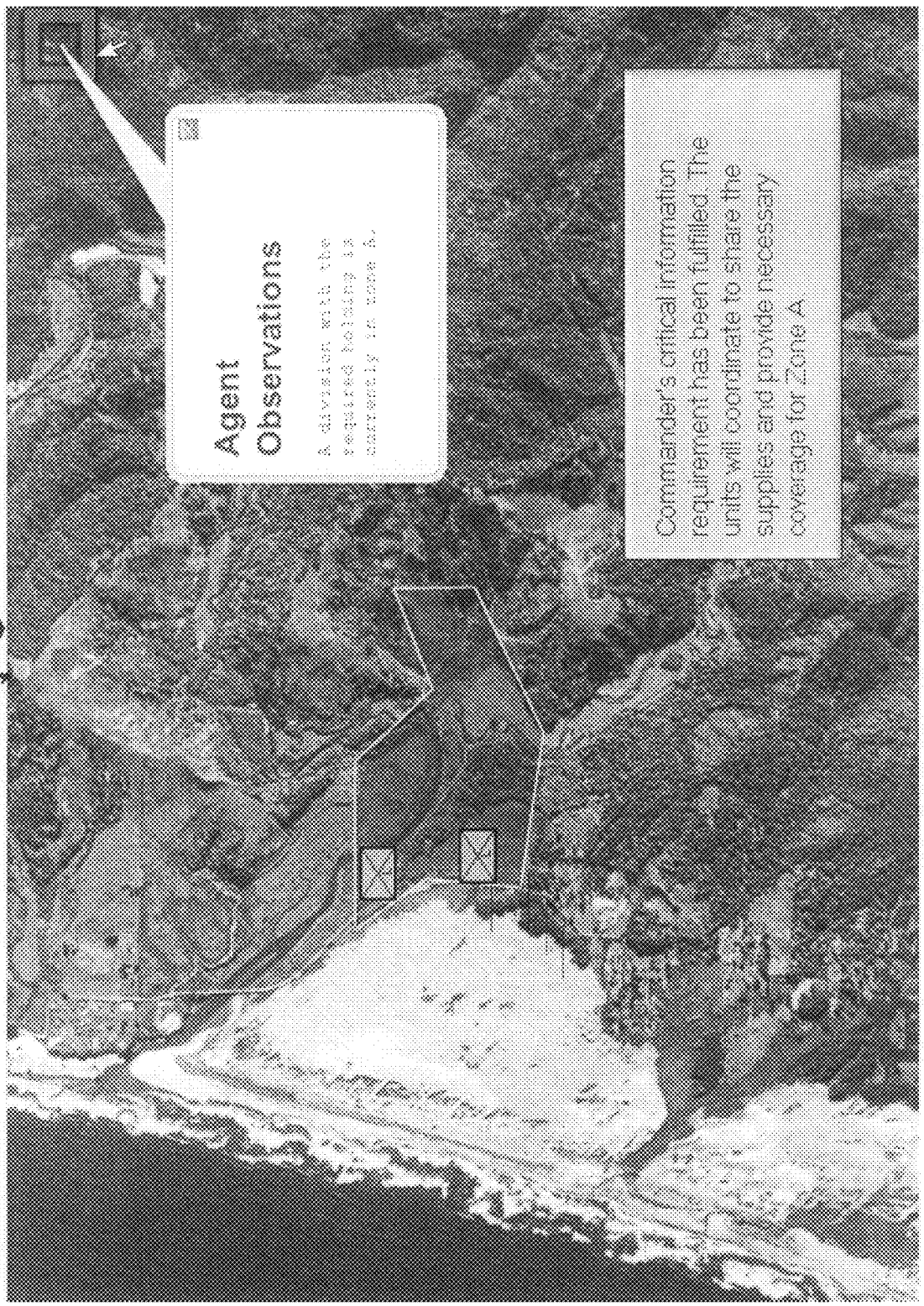
FIGS. 3-4 illustrate information being provided to a user according to an embodiment of the present invention.
Figure 4:

User interface 115 provides a user with information corresponding to the applicable environment. In an embodiment of the present invention the information includes, but not limited to, locations, plans, terrain, weather conditions, etc., obtained from AS ontology domain, current information sharing arrangements (i.e., showing connected entities, for example) obtained from the EC ontology domain; and information used for making decisions and recommendations (e.g., represented with a particular shade), which in most cases would be potential future states of the entities represented in the world view obtained from the IX domain. In an embodiment of the present invention, the user interface 115 enables a user to request specific information about an entities or "drill down" to details specific to entity, including details of the current situation, lists of potential situations, and details of specific entities represented in the world view. In an embodiment of the present invention, the user interface 115 enables a user to modify information sharing arrangements manually or set specific conditions that will cause automatic changes in sharing arrangements in the future thereby creating broad policies. In an embodiment of the present invention, the user interface 115 enables a user to receive notifications of pre-set types of situations (e.g., incidence of potential fratricide). FIGS. 3-4 illustrate information being provided to a user according to an embodiment of the present invention.

Interoperability bridge 125 provides functionality of processing data for use internally by the ontology. In an embodiment of the present invention, the Interoperability bridge translates incoming data into instances within the ontology that is used internally when the incoming data from external application system is in a foreign or non-native format not understood by the interoperability bridge. In an embodiment of the present invention, the formats include XML or a similar format (push), and database data, where input format can also be database-specific SQL query results. Format-specific connectors are developed for each of the input formats; they are essentially mapping subprograms that accept a particular format (e.g, XML subset or SQL query responses) and convert into internal format. They are developed as modules for inclusion in the bridge, for ease of upgrades, but could also be built-in.

External application systems 130 are applications that exchange information with IMT 105 over a network via an network interface. In most cases it is an existing application that is being augmented to provide extra functionality described herein. An external application system 130 can include a database, The database can be connected to the "outside world" and provides the situation information to the IMT. The database stores the current situation (world view) and updates it based on the incoming new information from connected systems. The configuration of the database 150 can vary widely depending on the party from which the information is being received. Most likely it will be XML-formatted stream of data. In case of military application, this would include locations of units, their holdings, capabilities, speed (if moving), their roles, plans and orders.

While the present invention has been described above mostly as embodied in an intention-based automated conflict prediction and notification system for military operations, it will be understood that the invention can be alternatively embodied in systems for use in other fields. Such fields include business and personal management, medical treatment, and other areas that include nondeterministic situations with dynamic elements and for which potential conflict identification and resolution would be advantageous. For example, in management applications, the system can be used for scheduling work groups such as salespersons or work crews, for coordinating the position and movement of satellites, commercial carriers (such as aircraft, trucks, and trains), and/or other objects, for planning and scheduling construction, engineering, manufacturing, or similar projects, for inventory control applications for any type of product, or for personal day planner applications. In medical treatment applications, the system can be used for avoiding prescribing medications that should not be taken together, avoiding medical procedures such as certain surgeries, diagnostic procedures, treatment procedures, and so forth that should not be performed on persons taking conflicting medications or with certain conditions, or in other medical applications where conflicts may arise.

It will be understood that the method described above can be carried out in various sequences, and the sequences describe herein are provided as an illustration only and by no means as a limitation. It will be further understood that the terms "a," "an," and "one" as used herein are not intended to mean only "one," but may also mean a plurality, and terms used in the plural form can include the plural form.

In view of the foregoing, it will be appreciated that present invention in an exemplary form provides an automated intention-based predictive support system. It should be understood that the foregoing relates only to the exemplary embodiments of the present invention, and that numerous changes may be made therein without departing from the spirit and scope of the invention as defined by the following claims.

The invention claimed is:

1. A system for providing intention-based automated conflict prediction, notification and information exchange management, comprising:
   an interoperability bridge configured to receive data and provide data to an ontology bus;
   the ontology bus including:
   an Application Specific domain configured to provide objects that define a view for a particular type of environment/application specific domain;
   an Exchange Control domain configured to provide current requirements for exchanging information; and
   an Information Extraction domain configured to store intermediate results of predicted occurrences based on the comparison of received data and an intent inferred from the received data with known data; and
   an engine configured to receive and monitor input from the objects that define the view for an occurrence of at least one pre-defined condition, wherein the occurrence of the predefined condition requires a change to a current information exchange agreement.

2. The system according to claim 1, wherein the interoperability bridge translates the received data from a first format to a second format.

3. The system according to claim 1, wherein the current information exchange agreement specifies a policy for the exchange of information between the system and an external system.

4. The system according to claim 1, wherein the data is received from an external system.

5. The system according to claim 1, wherein the engine predicts the potential occurrence of one or more conditions by comparing the received data with application specific knowledge data.

6. The system according to claim 5, wherein the application specific knowledge data is obtained from a application specific domain database.

7. The system according to claim 1, further comprising a user interface configured to provide information representing the current conditions of objects in the view.

8. The system according to claim 7, wherein the user interface is further configured to provide information representing ongoing information exchanges.

9. The system according to claim 1, wherein the Exchange Control domain is further configured to provide current settings for exchanging information and previous history of exchanging information.

10. A method of providing intention-based automated conflict prediction, notification and information exchange management, the method comprising:
    receiving data from and storing data to an ontology bus;
    providing objects that define a view, for a particular type of environment/application specific domain;
    providing requirements for exchanging information;
    storing intermediate results of predicted occurrences based on the comparison of received data and an intent inferred from the received data with known data in an Information Extraction domain; and
    receiving and monitoring, at an engine, input from the objects that define the view for an occurrence of at least one pre-defined condition, wherein the occurrence of the predefined condition requires a change to an exchange agreement that specifies the requirements for sharing information with an external application system.

11. The method according to claim 10, further comprising translating the received data from a first format to a second format.

12. The method according to claim 10, wherein the data is received from an external system.

13. The method according to claim 10, further comprising predicting the potential occurrence of one or more conditions by comparing the received data with application specific knowledge data.

14. The method according to claim 13, wherein the application specific knowledge data is obtained from a application specific domain database.

15. The method according to claim 10, further comprising providing information representing the current conditions of objects in the view.

16. The method according to claim 15, further comprising providing information representing ongoing information exchanges.

17. The method according to claim 10, further comprising providing current settings for exchanging information and previous history of exchanging information.

* * * * *